United States Patent Office 2,813,139
Patented Nov. 12, 1957

2,813,139

METHOD OF SEPARATING NORMAL OLEFINS AND PARAFFINS

Le Roi E. Hutchings, Crystal Lake, Ill., assignor to The Pure Oil Company, Chicago, Ill., a corporation of Ohio No Drawing. Application June 24, 1955, Serial No. 517,931

10 Claims. (Cl. 260—677)

This invention relates to a process for separating olefins from paraffins and is more particularly concerned with a process for separating liquid straight-chain olefins from normal paraffins of the same boiling range.

An object of this invention is to provide a method for separating olefinic from paraffinic hydrocarbons.

Another object of the invention is to provide a method for preparing substantially pure olefins and substantially pure paraffins.

A still further object of the invention is to provide a method for separating a mixture of olefins and paraffins into different fractions each of which is more concentrated with respect to either olefins or paraffins.

Other objects of the invention will appear from the following description of the process.

Normally liquid straight-chain olefins are useful as starting materials in the preparation of various types of materials, such as aldehydes, alcohols, acids and alkyl sulfates. Such olefins can be readily prepared by cracking highly paraffinic hydrocarbons such as are present in paraffin wax. However, considerable difficulty has been experienced in separating these olefins from the remaining uncracked paraffins. I have discovered that the olefins can be separated from the paraffins by first hydrohalogenating the olefins in the mixture and then contacting the hydrohalogenated mixture with zeolite having a critical average pore size of about 5 Angstrom units in diameter. Zeolite of this pore size will adsorb the paraffins without adsorbing the hydrohalogenated olefins, and will retain about 0.15 gram of paraffinic material per gram of zeolite. By properly proportioning the amount of zeolite to hydrohalogenated product, a hydrohalogenated effluent substantially free of paraffins can be obtained. A ratio of about 1 part of paraffins to 5 to 10 parts, but preferably about 7 parts, by weight of zeolite will result in the adsorption of substantially all the paraffins. This can be accomplished batchwise by mixing zeolite with the hydrochlorinated product, or the process can be made continuous by passing the feed stock through a plurality of zeolite adsorbers arranged in parallel so that the feed can be switched from one adsorber to another when one adsorber has become substantially saturated with paraffins.

In carrying out my invention, I may use synthetic or natural zeolites such as those disclosed in Patents Nos. 2,306,610 and 2,442,191. However, I prefer to use a synthetic zeolite made by dehydrating a synthetic calcium alumino-silicate. A dehydrated calcium alumino-silicate will have a pore size of 5 Angstrom units.

If the pore size is materially smaller than 5 Angstrom units, the pores are too small to adsorb the paraffins. If the pores are materially larger, the hydrochlorinated olefins are adsorbed as well as the paraffins so that effective separation cannot be obtained.

After removal of the paraffins from the hydrohalogenated olefins by adsorption on zeolite, the hydrohalogenated olefins are dehydrohalogenated in conventional manner to recover the desired olefins. The hydrogen halide split off in the dehydrohalogenation step in preferably recycled for further hydrohalogenation of cracked feed stock.

In carrying out my invention, paraffin wax or other normally paraffinic hydrocarbon material containing about 18 to 28 carbon atoms per molecule is cracked under relatively mild conditions, namely, about 320–330° C., to obtain a mixture of paraffinic and olefinic hydrocarbons having about 9–14 carbon atoms per molecule. The cracked material is hydrohalogenated by any well-known process for hydrohalogenating a mixture of olefins and paraffinic hydrocarbons, such as liquid phase hydrohalogenation at temperatures of about 20–80° C. using a zinc halide-oil mixture, or concentrated aqueous zinc halide catalyst as disclosed in Patent No. 2,705,734. I prefer low temperature hydrohalogenation in order to avoid further decomposition of the cracked stock. The hydrohalogenated mixture is then contacted with zeolite by mixing therewith or percolation through one or more chambers filled with zeolite having a pore size of about 5 Angstrom units in diameter. The amount of liquid feed to be contacted with or percolated through the zeolite can be determined by analyzing the feed stock for paraffin and olefin content and then calculating the quantity of paraffin which the zeolite in the chamber will adsorb. It will be evident that if it is desired only to concentrate the olefins instead of obtaining substantially pure olefins, the ratio of zeolite to feed stock will be such as to remove less than the entire paraffin content.

In continuous operation, when an adsorption chamber becomes saturated with paraffins it is cut out and regenerated by first desorbing the zeolite bed by stripping with super-heated steam at an elevated temperature not above 300° C. until the paraffins are substantially completely desorbed, and then heating to a temperature not above 300° C. under vacuum to remove any residual paraffins and/or water vapor. If desired the zeolite may first be washed with a naphthenic, aromatic or isoparaffinic solvent to remove any adherent hydrohalogenated hydrocarbons, prior to desorption. Benzene, isooctane or other solvent which differs sufficiently in boiling point from the halogen-containing hydrocarbons may be used.

The hydrohalogenated olefins denuded of all or part of the paraffins admixed therewith, are dehydrohalogenated by conventional methods such as contact at 180 to 250° C. with alumina-silica bleaching clay, or passage over bauxite at 300–350° C. The hydrogen halide which splits off is preferably recycled for further use in the hydrohalogenation of additional feed stock.

As a specific example of the invention, 100 pounds of paraffin wax having an average molecular weight of 340 is thermally cracked at atmospheric pressure and at a temperature of about 325° C. to produce a liquid paraffin-olefin fraction having an average molecular weight of about 170. The resulting liquid product contains approximately 40 pounds of paraffins and 40 pounds of olefins. Twenty pounds of gas and coke are also produced. The liquid product is hydrochlorinated with 9 pounds of hydrogen chloride in solution in a 70% aqueous zinc chloride solution at room temperature and at atmospheric pressure by intensive stirring for approximately 2 hours. About 200% of zinc chloride solution is used, based on the weight of olefins. Eighty-nine pounds of chlorinated product is obtained. The resulting hydrochlorinated product is contacted with 270 pounds of dehydrated synthetic calcium alumino-silicate zeolite made as previously described and having an average pore size of 5 Angstrom units in diameter, by agitating the hydrochlorinated product with the zeolite. The mixture is centrifuged in order to separate the unadsorbed liquid from the zeolite. The separated liquid consists of 49 pounds of hydrochlorinated olefins and 1 pound of paraffinic material. The zeolite is stripped with super-heated steam at a temperature of about 230° C. and then regenerated by heating to 300° C. at 25 mm. total pressure for a period of 1 hour. Thirty-nine pounds of paraffins are recovered from the zeolite. The unadsorbed liquid after separation from the zeolite is dehydrochlorinated by heating to approximately 250° C. in the presence of bleaching clay. A yield of 41 pounds of 97.5% pure olefins and 9 pounds of hydrogen chloride is obtained.

Although hydrogen chloride is used in the specific example, other halogen halides, particularly hydrogen bromide, are effective. In the event other hydrogen halide is used, the zinc salt used in the hydrohalogenating step should correspond to the hydrogen halide.

It will be seen, therefore, that high molecular weight olefins of high purity can be obtained in accordance with the process just described.

I claim:

1. The method of separating olefins from paraffins comprising hydrohalogenating a liquid mixture of olefins and paraffins, contacting the liquid mixture with zeolite having a pore size of about 5 Angstrom units in diameter to selectively adsorb the paraffins, separating the unadsorbed hydrohalogenated olefins from the zeolite containing adsorbed paraffins and dehydrohalogenating the hydrohalogenated olefins.

2. Method in accordance with claim 1 in which the zeolite is a calcium alumino-silicate.

3. Method in accordance with claim 1 in which hydrohalogenation is effected with hydrogen chloride.

4. Method in accordance with claim 1 in which the mixture of olefins and paraffins is cracked paraffin wax containing hydrocarbons of about 9–14 carbon atoms.

5. Method in accordance with claim 4 in which the cracked paraffin wax is contacted with zeolite in the amount of about 1 part by weight of paraffin content to about 7 parts by weight of zeolite.

6. Method in accordance with claim 1 in which the zeolite saturated with paraffins is regenerated by steam stripping the paraffins followed by heating to about 300° C. under vacuum.

7. The process of preparing high boiling straight-chain, normal olefins comprising cracking paraffin wax to obtain a liquid mixture of paraffins and olefins, hydrochlorinating the olefins in the mixture, separating the hydrochlorinated olefins from the paraffins by contacting the liquid mixture with zeolite having a pore size of about 5 Angstrom units in diameter, and dehydrochlorinating the separated hydrochlorinated olefins.

8. Method in accordance with claim 5 in which a highly concentrated paraffinic fraction is recovered by desorbing the zeolite with steam.

9. The method of separating olefins from paraffins comprising hydrohalogenating a mixture of olefins and paraffins having about 9–14 carbon atoms per molecule, under conditions to hydrohalogenate the olefins, and contacting the hydrohalogenated mixture with zeolite having a pore size of about 5 Angstrom units in diameter, in a ratio of about 5 to 10 parts by weight of zeolite to 1 part of paraffin, under conditions to selectively adsorb paraffins from the hydrohalogenated mixture.

10. Method in accordance with claim 9 in which the olefins are hydrohalogenated with hydrogen chloride.

References Cited in the file of this patent

UNITED STATES PATENTS

| | | |
|---|---|---|
| 2,390,536 | Houdry et al. | Dec. 11, 1945 |
| 2,522,426 | Black | Sept. 12, 1950 |
| 2,611,789 | Good et al. | Sept. 23, 1952 |
| 2,705,734 | Tramm et al. | Apr. 5, 1955 |